US012611028B2

(12) United States Patent
Yono et al.

(10) Patent No.: US 12,611,028 B2
(45) **Date of Patent: *Apr. 28, 2026**

(54) HAIRBRUSH HEATING DEVICE

(71) Applicants: Raja Yono, West Bloomfield, MI (US); Stephanie Jundy, Farmington Hills, MI (US)

(72) Inventors: Raja Yono, West Bloomfield, MI (US); Stephanie Jundy, Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,783

(22) Filed: Aug. 28, 2023

(65) Prior Publication Data

US 2023/0397715 A1 Dec. 14, 2023

Related U.S. Application Data

(63) Continuation of application No. 16/698,128, filed on Nov. 27, 2019, now Pat. No. 11,779,105.

(51) Int. Cl.

*A46B 17/00* (2006.01)
*A45D 20/52* (2006.01)
*H05B 1/02* (2006.01)

(52) U.S. Cl.

CPC .............. *A46B 17/00* (2013.01); *A45D 20/52* (2013.01); *H05B 1/0252* (2013.01); *A46B 2200/104* (2013.01)

(58) Field of Classification Search

CPC .......... A45D 4/16; A45D 4/10; A45D 20/525; A45D 20/52; A45D 1/20; A45D 44/18; A45D 2200/15; A45D 2200/155; A46B 17/06; A46B 17/065

See application file for complete search history.

(56) References Cited

U.S. PATENT DOCUMENTS

| | | | | |
|---|---|---|---|---|
| 11,779,105 | B2 * | 10/2023 | Yono | H05B 1/0252 219/385 |
| 2012/0132648 | A1 * | 5/2012 | Ingleby-Oddy | A45D 4/16 219/635 |
| 2013/0085556 | A1 * | 4/2013 | Gillespie | A61H 23/0263 607/114 |
| 2014/0075694 | A1 * | 3/2014 | Toh | A45D 4/16 15/160 |
| 2016/0302567 | A1 * | 10/2016 | Gorelick | A46B 17/065 |
| 2019/0223585 | A1 * | 7/2019 | Wigand | A61L 2/10 |
| 2019/0274421 | A1 * | 9/2019 | Cosolito | A46B 17/065 |

* cited by examiner

*Primary Examiner* — Rachel R Steitz

(74) *Attorney, Agent, or Firm* — Howard & Howard Attorneys PLLC

(57) ABSTRACT

A hairbrush heating device operable to selectively heat a hairbrush placed there within is provided. The hairbrush heating device includes a hairbrush cavity, a sensor operable to output a signal indicating presence of a hairbrush within the hairbrush cavity, and a heating element configured to selectively provide heat to the hairbrush cavity based upon the signal from the sensor.

16 Claims, 9 Drawing Sheets

HAIRBRUSH HEATING DEVICE

CROSS-REFERENCE TO RELATED APPLICATIONS

The subject patent application claims priority to, and all the benefits of, U.S. patent application Ser. No. 16/698,128, filed on Nov. 27, 2019, the entire contents of which are incorporated by reference herein.

BACKGROUND

The disclosure generally relates to a hairbrush heating device, in particular, to a device useful to heat a hairbrush placed within a cavity of the device.

Hair stylists use hairbrushes to style hair. In some instances, a heated hairbrush can be useful to achieve particular hair styling results. The heated hairbrush additionally prevents damage to the hair because a stylist does not have to apply additional heat to the hair to heat the hairbrush during styling.

SUMMARY

Hairbrush heating devices can be useful to heat a hairbrush. A hairbrush heating device with an automatic heating switch can be useful to heat a hairbrush at a desired time without wasting energy when no heating is required.

A hairbrush heating device operable to selectively heat a hairbrush placed there within is provided. The hairbrush heating device includes a hairbrush cavity, a sensor operable to output a signal indicating presence of a hairbrush within the hairbrush cavity, and a heating element configured to selectively provide heat to the hairbrush cavity based upon the signal from the sensor.

In some embodiments, the heating element is provided within an air heating circuit attached to the hairbrush cavity.

In some embodiments, the air heating circuit comprises a blower fan, an air return plenum duct, and an air supply plenum duct.

In some embodiments, the air return plenum duct is attached to the hairbrush cavity, the air supply plenum duct is attached to the hairbrush cavity, and the hairbrush heating device includes a fluidic circuit through the air heating circuit and the hairbrush cavity, wherein air is cycled repeatedly through the fluidic circuit.

In some embodiments, the heating element includes an infrared heating element disposed within the hairbrush cavity.

In some embodiments, the hairbrush cavity includes at least one closing flap configured to interrupt air flow through an opening of the hairbrush cavity.

In some embodiments, the hairbrush cavity includes a temperature sensor, and the heating element is controlled based upon utilizing data from the temperature sensor to maintain a temperature within the hairbrush cavity within a desired temperature range.

In some embodiments, the hairbrush heating device further includes control hardware operable to receive inputs from a user setting values for the desired temperature range.

In some embodiments, the hairbrush heating device further includes control hardware operable to enable a user to select between an off state, an on state, and an automatic state.

In some embodiments, the hairbrush heating device further includes control hardware operable to enable a user to select between an off state, an on state, and an automatic state.

In some embodiments, the hairbrush heating device further includes touchscreen control hardware operable to display options to a user and receive user inputs.

In some embodiments, the hairbrush heating device further includes a plurality of hairbrush cavity openings.

In some embodiments, the hairbrush heating device further includes a plurality of hairbrush cavities, and the heating element is provided within an air heating circuit attached to each of the hairbrush cavities, wherein the air heating circuit is configured to provide air to each of the hairbrush cavities in a parallel flow.

In some embodiments, the hairbrush heating device further includes a plurality of hairbrush cavities, and each of the hairbrush cavities includes a heating element including an infrared heating element. In some embodiments, each of those infrared heating elements are individually controllable.

In some embodiments, the hairbrush cavity is configured to be installed to a aperture in a countertop.

In some embodiments, the hairbrush heating device further includes a flat base, and the hairbrush cavity is oriented at an acute angle with respect to the flat base. In some embodiments, the hairbrush heating device wherein the hairbrush cavity is oriented at an acute angle further includes a plurality of hairbrush cavity openings.

According to one alternative embodiment, a hairbrush heating device operable to selectively heat a hairbrush placed there within is provided. The hairbrush heating device includes a hairbrush cavity, a sensor operable to output a signal indicating presence of a hairbrush within the hairbrush cavity, and an air heating circuit including a blower fan, an air return plenum duct, an air supply plenum duct, and a heating element configured to selectively provide heat to the hairbrush cavity based upon the signal from the sensor. In some embodiments, the air return plenum duct is attached to the hairbrush cavity, the air supply plenum duct is attached to the hairbrush cavity, and the hairbrush heating device includes a fluidic circuit through the air heating circuit and the hairbrush cavity, wherein air is cycled repeatedly through the fluidic circuit.

According to one alternative embodiment, a hairbrush heating device operable to selectively heat a hairbrush placed there within is provided. The hairbrush heating device includes a hairbrush cavity including at least one closing flap configured to interrupt air flow through an opening of the hairbrush cavity, a sensor operable to output a signal indicating presence of a hairbrush within the hairbrush cavity, and an infrared heating element disposed within the hairbrush cavity configured to selectively provide heat to the hairbrush cavity based upon the signal from the sensor.

The above features and advantages and other features and advantages of the present disclosure are readily apparent from the following detailed description of the best modes for carrying out the disclosure when taken in connection with the accompanying drawings.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity, directional terms may be used with respect to the drawings. Directional terms are not to be construed to limit the scope of the disclosure. Furthermore, the disclosure, as illustrated and described herein, may be practiced in the absence of an element that is not specifically disclosed herein.

Figure 1:
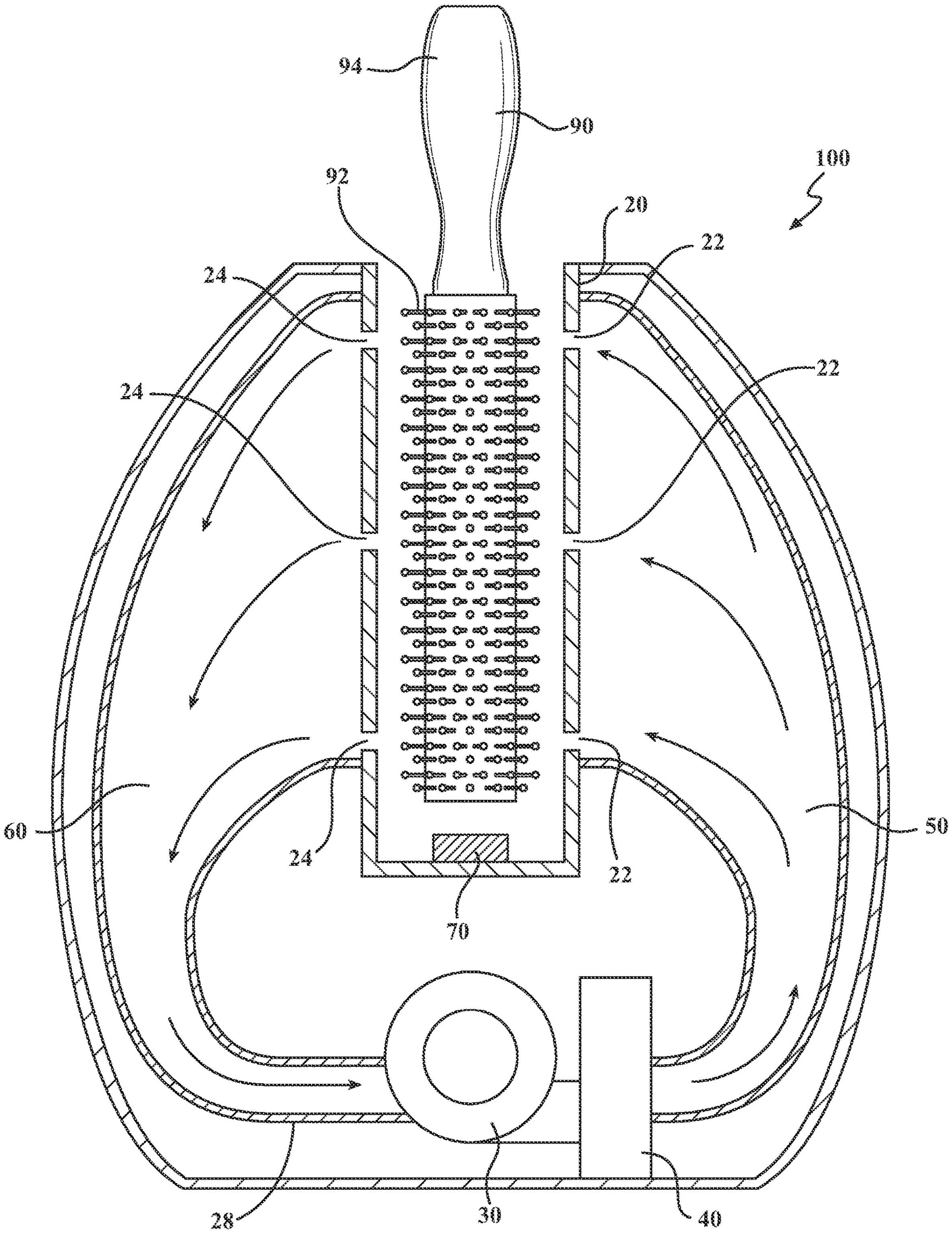
FIG. 1 schematically illustrates in cross sectional view an exemplary embodiment of a hairbrush heating device, in accordance with the present disclosure.

Referring to the drawings, wherein like reference numerals correspond to like or similar components throughout the several Figures, FIG. 1 schematically illustrates in cross sectional view an embodiment of a hairbrush heating device 100. Hairbrush cavity 20 of hairbrush heating device 100 is illustrated including an open-topped cavity into which a hairbrush can be placed to be heated. A hairbrush cavity can be cylindrical with a round cross section. In other embodiments, the hairbrush cavity can include an oval, square, triangular, or other similar cross-sectional shape. Hairbrush cavity 20 is illustrated with a hairbrush 90 including hairbrush bristles 92 and handle 94 placed there within. Hairbrush cavity 20 is operable to selectively heat hairbrush when it is placed there within. Hairbrush cavity 20 includes inlet apertures 22 operable to receive a flow of hot air from an air heating circuit 28 and outlet apertures 24 operable to permit hot air to flow from hairbrush cavity 20 back into the air heating circuit 28.

An air heating circuit 28 can include various alternative embodiments. In the embodiment of FIG. 1, the air heating circuit 28 can be defined to include a return plenum duct a blower motor and fan 30, a heating element 40, and an air supply plenum duct 50.

Heat can be selectively applied to hairbrush 90 according to a number of criteria. A user can be presented with an on/off switch for manual selection. A user can be presented with control options for intensity of heat to be applied to the hairbrush, for example, selecting a power output of heating element of the air heating circuit 28. A user can be presented with a cycle heat option which heats a hairbrush for a particular period of time, and after the period, the heat is cycled off. Such a cycle heat option can additionally include a dial or other scalar input to control a length or degree of heating. In another embodiment, an electronic switch can be used to detect a hairbrush placed within the hairbrush cavity, and heating of the hairbrush can be selectively activated and deactivated based upon whether the electronic switch detects the presence of the hairbrush. In another embodiment, a temperature sensor can be used to detect air temperature within the hairbrush cavity, and heating can be activated and deactivated based upon measuring and maintaining a desired temperature within the hairbrush cavity. In the embodiment of FIG. 1, a sensor operable to detect presence of a hairbrush 90 is embodied as a proximity switch 70 and is used to detect presence of hairbrush 90 within hairbrush cavity 20. Proximity switch 70 can include any electromechanical switch capable of generating a signal based upon whether an object such as a hairbrush is pressing upon the switch. In one embodiment, proximity switch can employ magnetics to detect a hairbrush configured with a metallic or magnetic plate to provide an input to the proximity switch. In another embodiment, a plurality of hairbrushes can be employed, for example, with different quick response (QR) codes imprinted upon an end of the hair brush, and the proximity switch can include a camera device configured to read the QR codes and control the hairbrush heating device to provide customizable heating cycles based upon which hairbrush is placed within the device.

One advantage of the hairbrush heating device 100 of FIG. 1 is that by controlling heating within hairbrush cavity with proximity switch 70, such that the heating element used to heat the hairbrush is only on at desired times, thereby conserving electrical power usage. Another advantage is that the air heating circuit 28 is a fluidic circuit, meaning that hot air is supplied to hairbrush cavity 20 through inlet apertures 22 and is removed through outlet apertures 24, such that air can make a continuous circuit through hairbrush heating device 100 without substantial air intake from outside of the device. Such a fluidic circuit system is helpful in that the handle 94 extending from the device will not have hot air blowing outwardly upon it making the handle hot to the touch, and the unit can be quieter than a similar unit that draws in air and expels air, with the entire flow of air being internal to the unit and thereby avoiding air rush noises associated with drawn or expelled air.

Figure 2:
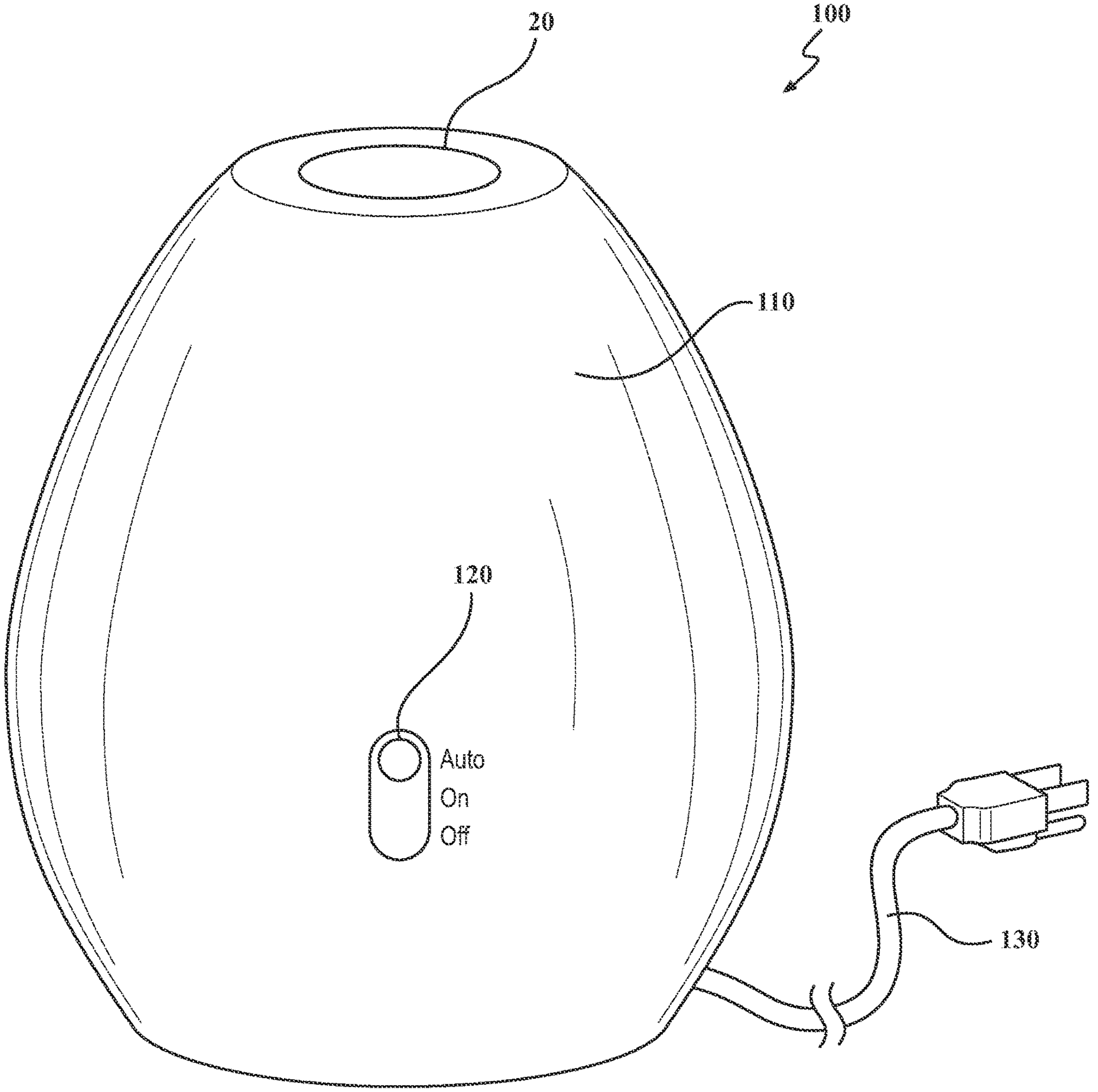
FIG. 2 illustrates in perspective view the hairbrush heating device of FIG. 1, FIG. 3 schematically illustrates in cross sectional view a second exemplary embodiment of a hairbrush heating device, in accordance with the present disclosure.

FIG. 2 illustrates in perspective view the hairbrush heating device 100 of FIG. 1. Hairbrush heating device 100 is illustrated including hairbrush cavity 20, outer housing 110, control hardware 120, and power cord 130. Control hardware 120 can be a simple switch, for example, including on, off, and automatic settings. In another embodiment, control hardware 120 can be a touch input liquid crystal display (LCD) screen, a plurality of buttons, for example, connected to a printed circuit board, or any other input device in the art. Power cord 130 can be plugged into a commonly available electrical outlet to provide power to the device.

Figure 3:
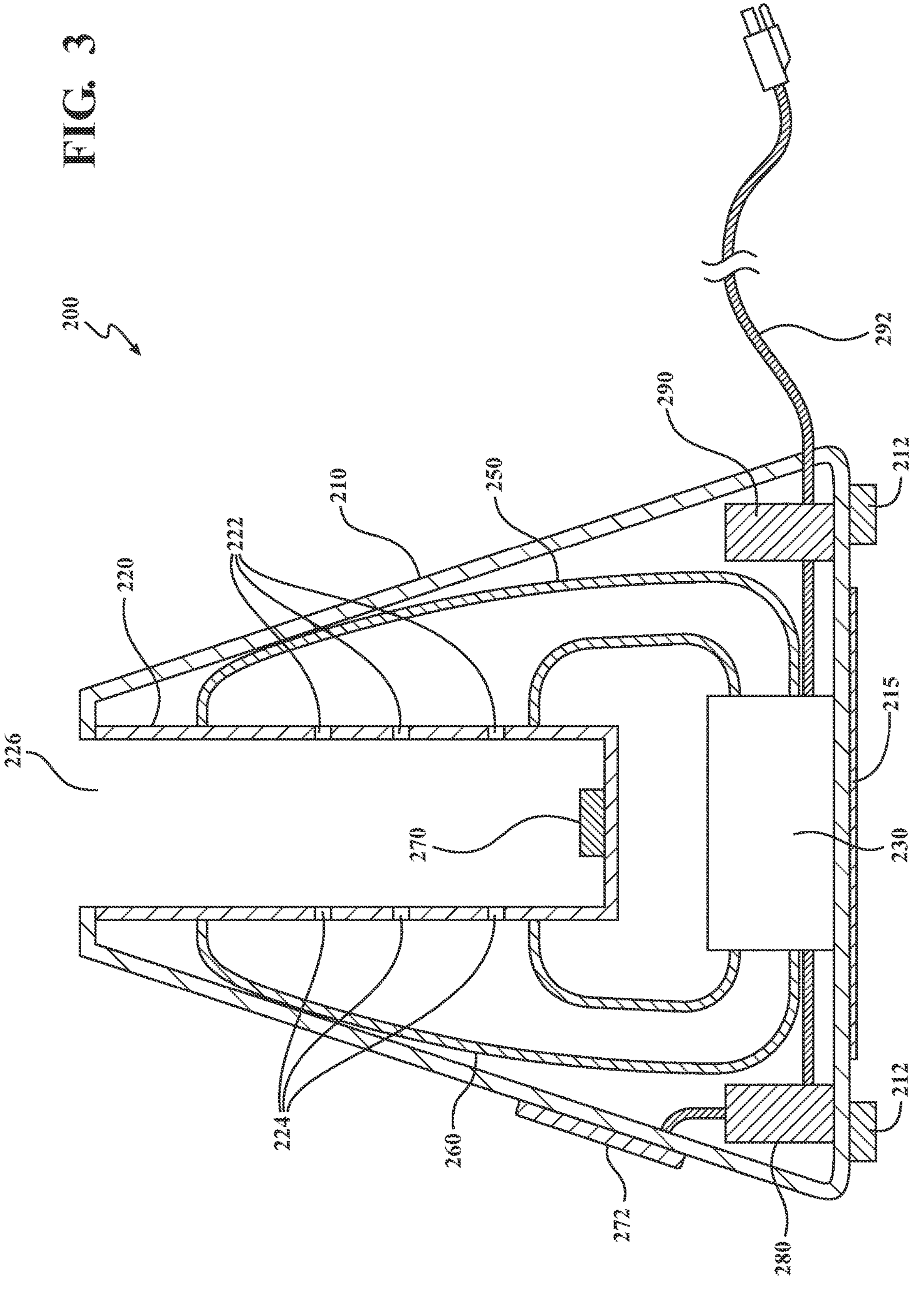

FIG. 3 schematically illustrates in cross sectional view a second embodiment of a hairbrush heating device 200. Hairbrush heating device 200 is illustrated, including outer housing 210, hairbrush cavity 220, blower heater assembly 230, air return plenum duct 260, air supply plenum duct 250, control hardware 272, controller 280, power inverter 290, and power cord 292. Outer housing 210 is illustrated including a conical or pyramidal device, with a relatively wide base and a relatively narrow top. The relatively wide base aids in stability of the device, such that a user can casually place and remove a hairbrush from hairbrush cavity 220 without being worried about the device tipping over. Rubberized pads 212 can additionally be placed upon a bottom of outer housing 210 to aid in preventing the device from moving when a user places or removes a hairbrush from hairbrush cavity 220. Hairbrush cavity 220 includes inlet apertures 222 operable to receive a flow of heated air from air supply plenum duct 250, and hairbrush cavity 220 includes outlet apertures 224 operable to provide a flow of return air to air return plenum duct 260. Hairbrush cavity 220 includes hairbrush cavity opening 226 configured to receive a portion of a hairbrush. In the particular embodiment of FIG. 3, hairbrush cavity opening 226 is open. In other embodiments, hairbrush cavity opening 226 can be covered or air flow there through can be interrupted, for example, with elastic flaps or a removable cap, for example, to retain heat within hairbrush cavity 220. Blower heater assembly 230 is connected to air return plenum duct 260 and receives a flow of return air. Blower heater assembly 230 propels and heats the supplied air and provides a flow of heated air to air supply plenum duct 250. Proximity switch 270 is provided at a bottom end of hairbrush cavity 220. Proximity switch 270 in other embodiments could be located on the sides of hairbrush cavity 220, and multiple proximity switches can simultaneously be utilized within a single hairbrush cavity 220.

Power cord 292 is configured to supply alternating current electrical power from an electrical outlet. Power inverter 290 receives electrical power through power cord 292 and may transform the alternating current electrical power into direct current electrical power and/or transform the voltage of the power supplied. Control hardware 272 is provided including an exemplary touch screen LCD display operable to display information to a user and receive touch inputs to the touch screen display. Controller 280 is a computerized device operable to execute stored programming and receives signals from control hardware 272. Controller 280 provides control commands to blower heater assembly 230. An optional metallic plate 215 is illustrated attached to a bottom of hairbrush heating device 200 for the purpose of adding more weight to the device and making the device more stable upon a countertop and less likely to tip over.

Figure 4:
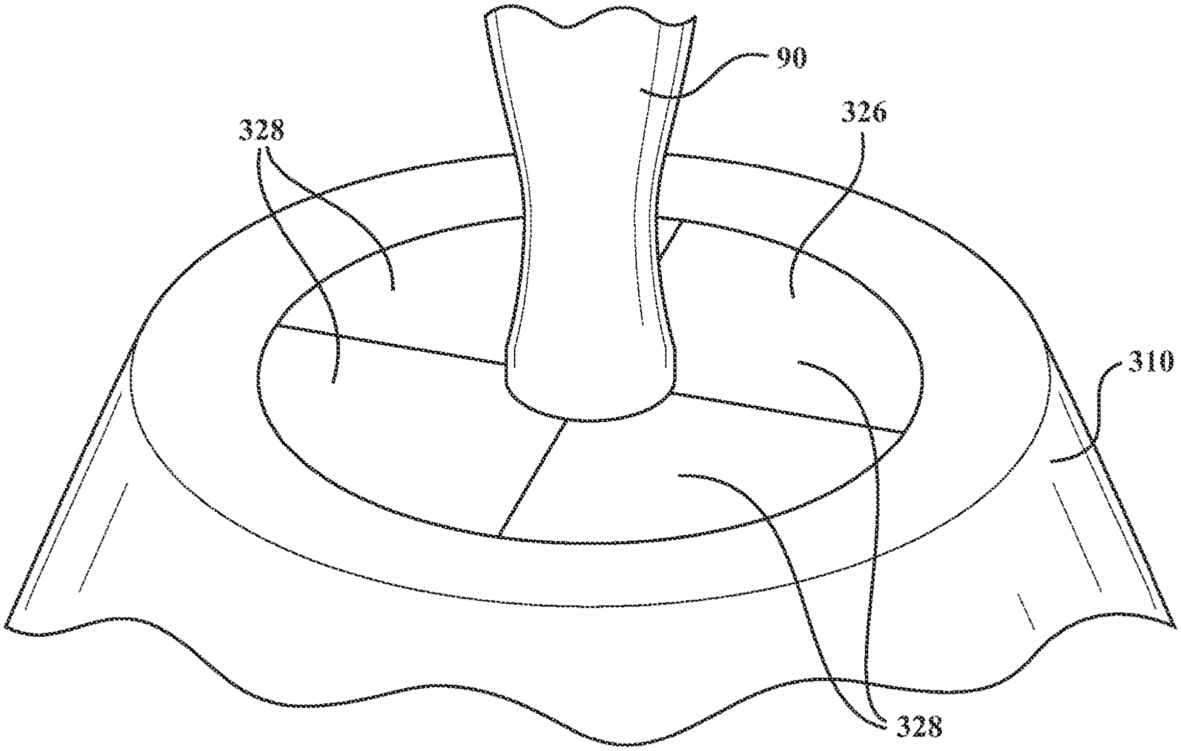
FIG. 4 illustrates in perspective view an exemplary hairbrush cavity opening including optional closing flaps operable to retain heat within the hairbrush cavity, in accordance with the present disclosure.

FIG. 4 illustrates in perspective view a hairbrush cavity opening 326 including optional closing flaps 328 operable to retain heat within the hairbrush cavity. Outer housing 310 is illustrated. Closing flaps 328 are illustrated covering hairbrush cavity opening 326 to a hairbrush cavity of the device. Closing flaps 328 can be elastic, for example, formed with a flexible polymer material configured to be pliable enough to enable one to easily insert and remove hairbrush 90, while being resilient enough to return to a desired original flat shape after permitting the hairbrush to be placed within or removed from hairbrush cavity opening 326. Closing flaps 328 may additionally be made of material selected to tolerate the elevated temperatures within the neighboring hairbrush cavity.

Figure 5:
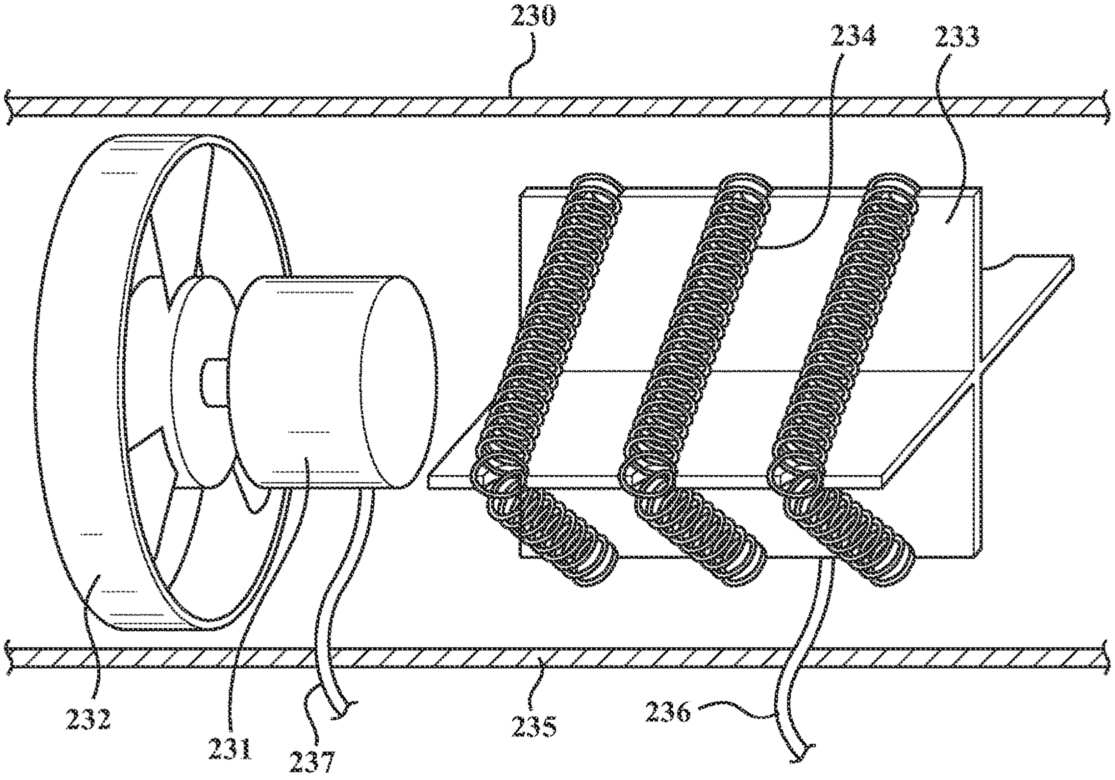
FIG. 5 schematically illustrates in cross sectional view a blower heater assembly operable to heat and propel air through an air heating circuit, in accordance with the present disclosure.

FIG. 5 schematically illustrates in cross sectional view a blower heater assembly 230 operable to heat and propel air through an air heating circuit. Blower heater assembly 230 is illustrated including a cylindrical outer housing 235 containing blower motor 231, blower fan 232, heating element substrate 233, and heating element coils 234. Blower motor 231 is an electrical machine configured to translate electrical power into an output torque upon an output shaft. The output shaft of blower motor 231 is attached to blower fan 232, which includes a plurality of fan blades configured to propel air through an internal space of the cylindrical outer housing 235. Heating element substrate 233 is illustrated including a material that can hold in place heating element coils 234 and tolerate the high temperature thereof. Heating element coils 234 are typically metallic and include resistive coiled wire that heat up when an electrical current is passed there through. Power cord 237 supplies power to blower motor 231, and power cord 236 supplies power to heating element coils 234. Blower heater assembly 230 can be controlled directly by an external controller, for example, with changing voltages of electrical power being supplied through power cord 236 and power cord 237. In another embodiment, blower heater assembly 230 can include a dedicated controller attached to or contained within blower heater assembly 230. Air entering blower heater assembly 230 is propelled by blower fan 232 and heated by heating element coils 234, such that a flow of heated air is propelled from blower heater assembly 230 for use in heating a hairbrush.

Figure 6:
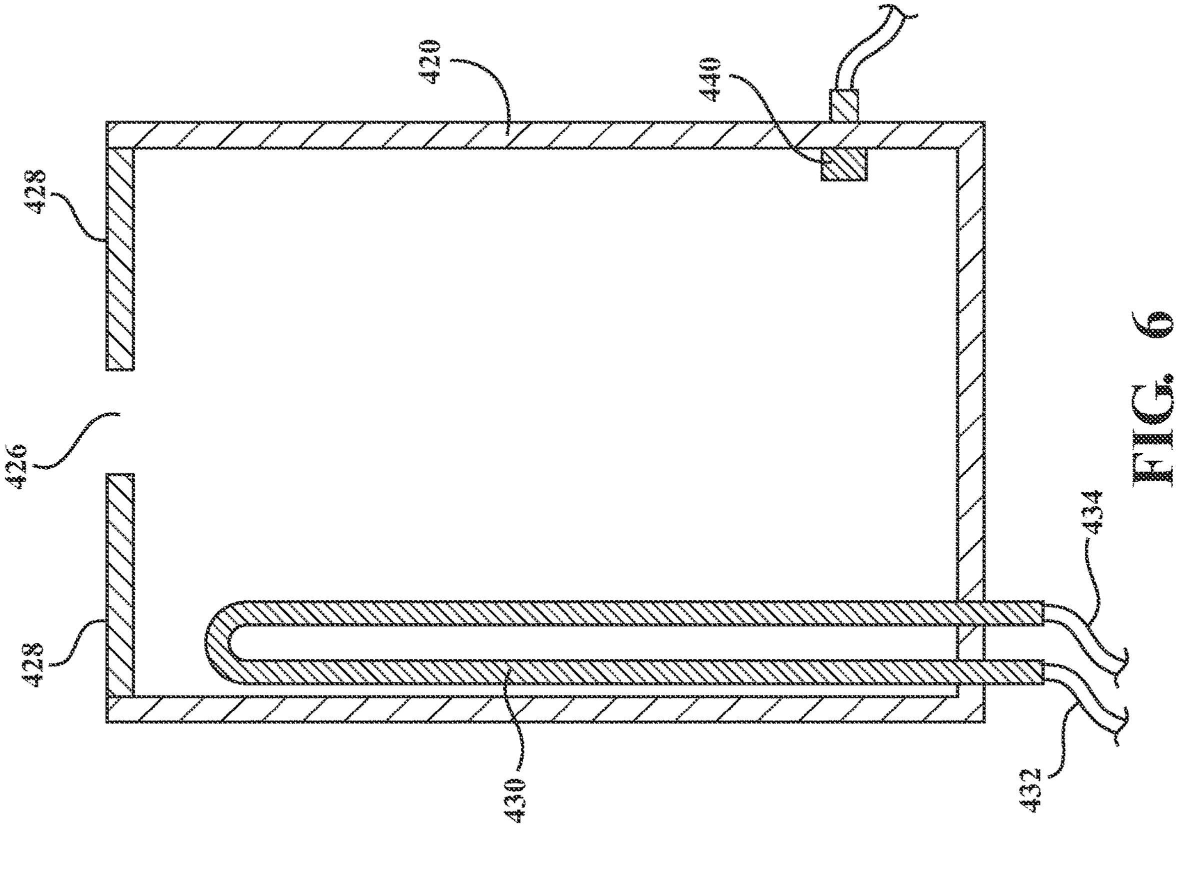
FIG. 6 schematically illustrates in cross sectional view an infrared heating element useful to additionally or alternatively heat a hairbrush within a hairbrush cavity, in accordance with the present disclosure.

Heated air can be supplied to a hairbrush cavity to selectively heat a hairbrush within the cavity. FIG. 6 schematically illustrates in cross sectional view an infrared heating element useful to additionally or alternatively heat a hairbrush within a hairbrush cavity. Hairbrush cavity 420 is illustrated, including hairbrush cavity opening 426 and optional flaps 428. An infrared heating element 430 is illustrated including a circuitous loop of resistive metal configured to release heat energy in the form of infrared emissions into hairbrush cavity 420 and includes electrical connections 432 and 434, which can be connected to an electrical power source. Infrared emissions can be used in isolation to heat a hairbrush, or infrared emissions can be used in combination with an air heating circuit 28 as is illustrated in FIG. 1 to cooperatively heat a hairbrush. Temperature sensor 440 is located within hairbrush cavity 420, such that infrared heating element 430 can be selectively energized to maintain hairbrush cavity 420 at a desired temperature or within a desired temperature range. Temperature sensor 440 may be provided in addition to a sensor operable to detect presence of a hairbrush within hairbrush cavity 420. An infrared heating element can include any device that translates electrical energy into radiative heat and can include a resistive element, for example, with a black or dark surface, or a light bulb operable to maximize radiative heat output.

Infrared energy is absorbed more readily by darker objects than lighter objects. A hairbrush can be utilized in combination with the infrared heating element of FIG. 6, for example, with black bristles and a white handle, such that areas that are intended to be heated can reach higher temperatures than areas not intended to be heated. In one embodiment, an inner surface of hairbrush cavity 420 can be coated with a reflective material, such that infrared energy emitted by infrared heating element 430 is more efficiently transferred to the hairbrush within hairbrush cavity 420.

Figure 7:
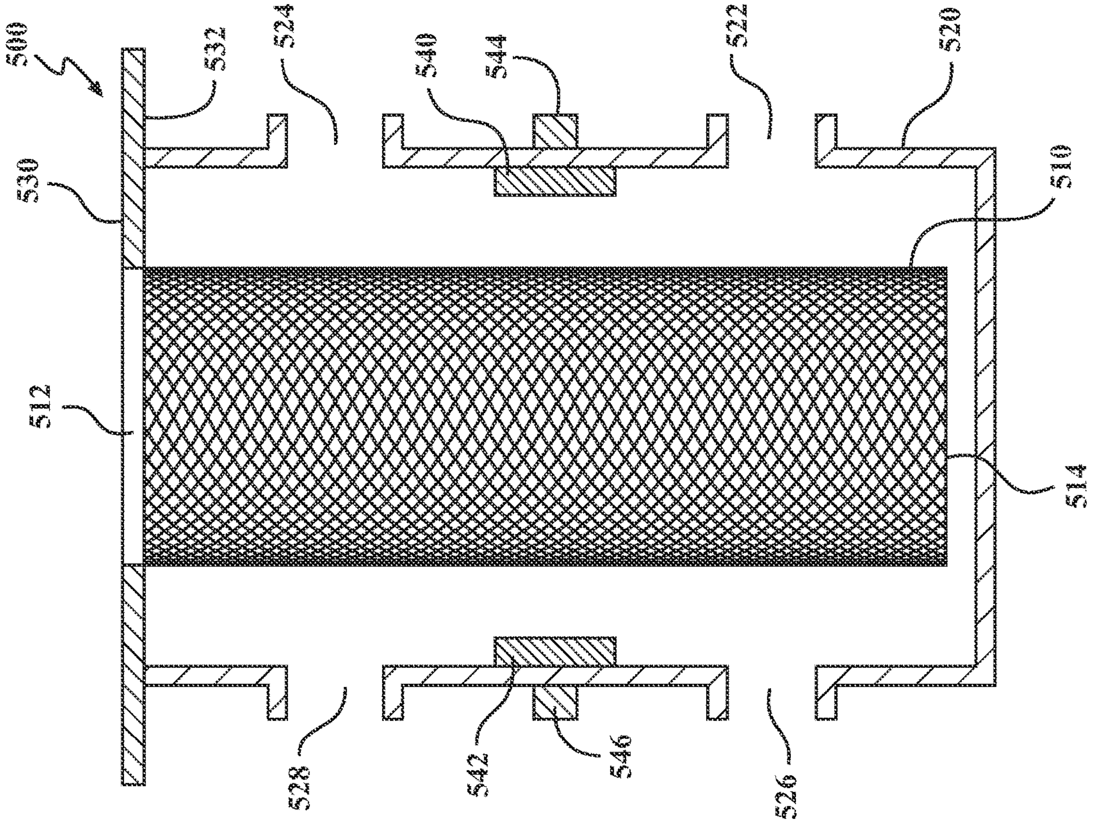
FIG. 7 schematically illustrates an additional exemplary embodiment of a hairbrush cavity of a hairbrush heating device operable to be installed in a countertop or other external surface, in accordance with the present disclosure.

FIG. 7 schematically illustrates an additional embodiment of a hairbrush cavity 500 of a hairbrush heating device operable to be installed in a countertop or other external surface. Hairbrush cavity 500 is provided including an outer housing 520, an inner housing 510 and an annular lip 530. Outer housing 520 is provided including an inlet aperture 522, an inlet aperture 524, an outlet aperture 526, and an outlet aperture 528. Inlet apertures 522 and 524 are configured to be attached to air supply hoses. Outlet apertures 526 and 528 are configured to be attached to air return hoses. Outer housing 520 may include a sensor operable to detect presence of a hairbrush embodied as an electronic photo switch 540 and a matching electronic switch 542, wherein light passed by electronic photo switch 540 is detected by matching electronic switch 542. Electronic photo switch 540 and matching electronic switch 542 collectively are operable to detect presence of a hairbrush within hairbrush cavity 500. Electronic photo switch 540 includes electrical connection 544 configured to be attached to an electrical lead, and matching electronic switch 542 includes electrical connection 546 configured to be attached to an electrical lead.

Inner housing 510 includes a wire mesh material configured to permit heated air to freely pass through inner housing 510. Inner housing 510 includes an open end 512 configured to receive a hairbrush and a closed end 514 configured to support a hairbrush placed within inner housing 510. Annular lip 530 includes bottom surface 532 and is configured to rest upon a countertop or other similar surface. A aperture can be cut in or formed upon the countertop, and annular lip 530 can rest upon the countertop, with a remainder of hairbrush cavity 500 being below the countertop level and concealed there below.

Figure 8:
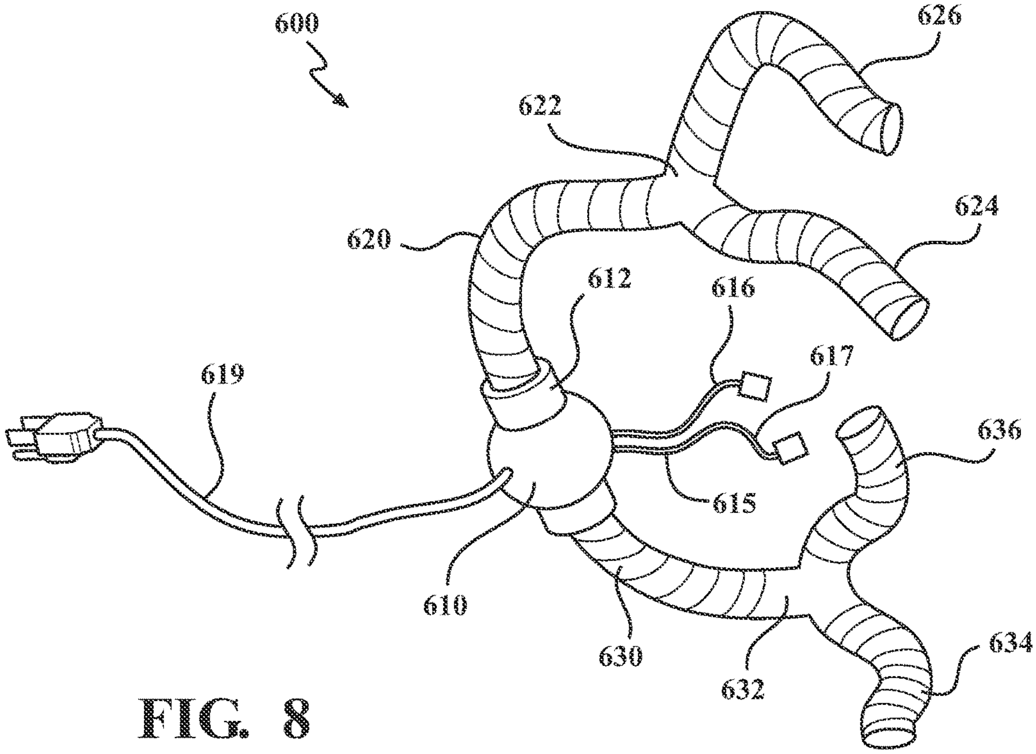
FIG. 8 illustrates in perspective view an air heating circuit useful to be connected to the hairbrush cavity of FIG. 7, in accordance with the present disclosure.

FIG. 8 illustrates in perspective view an air heating circuit 600 useful to be connected to the hairbrush cavity of FIG. 7. Air heating circuit 600 is illustrated including blower heater assembly 610, interconnected air return hoses 620, 624, and 626, interconnected air supply hoses 630, 634, and 636, electrical leads 616 and 617, and power cord 619. Air heating circuit 600 is configured to be attached to hairbrush cavity 500 of FIG. 7 and provides a flow of heated air thereto. Blower heater assembly 610 is similar to the blower heater assembly of FIG. 5. Blower heater assembly 610 includes air return inlet 612 configured to be attached to interconnected air return hoses 620, 624, and 626. Blower heater assembly 610 includes air supply outlet configured to be attached to interconnected air supply hoses 630, 634, and 636. Interconnected air return hoses 620, 624, and 626 include a Y-joint 622. Interconnected air supply hoses 630, 634, and 636 include a Y-joint 632. Electrical connection harness 615 includes electrical lead 616 and electrical lead 617 and is configured to be attached to electronic photo switch 540 and matching electronic switch 542 of FIG. 7. Blower heater assembly 610 includes a controller there within configured to control operation of blower heater assembly 610 based upon control signals received through electrical connection harness 615.

Figure 9:
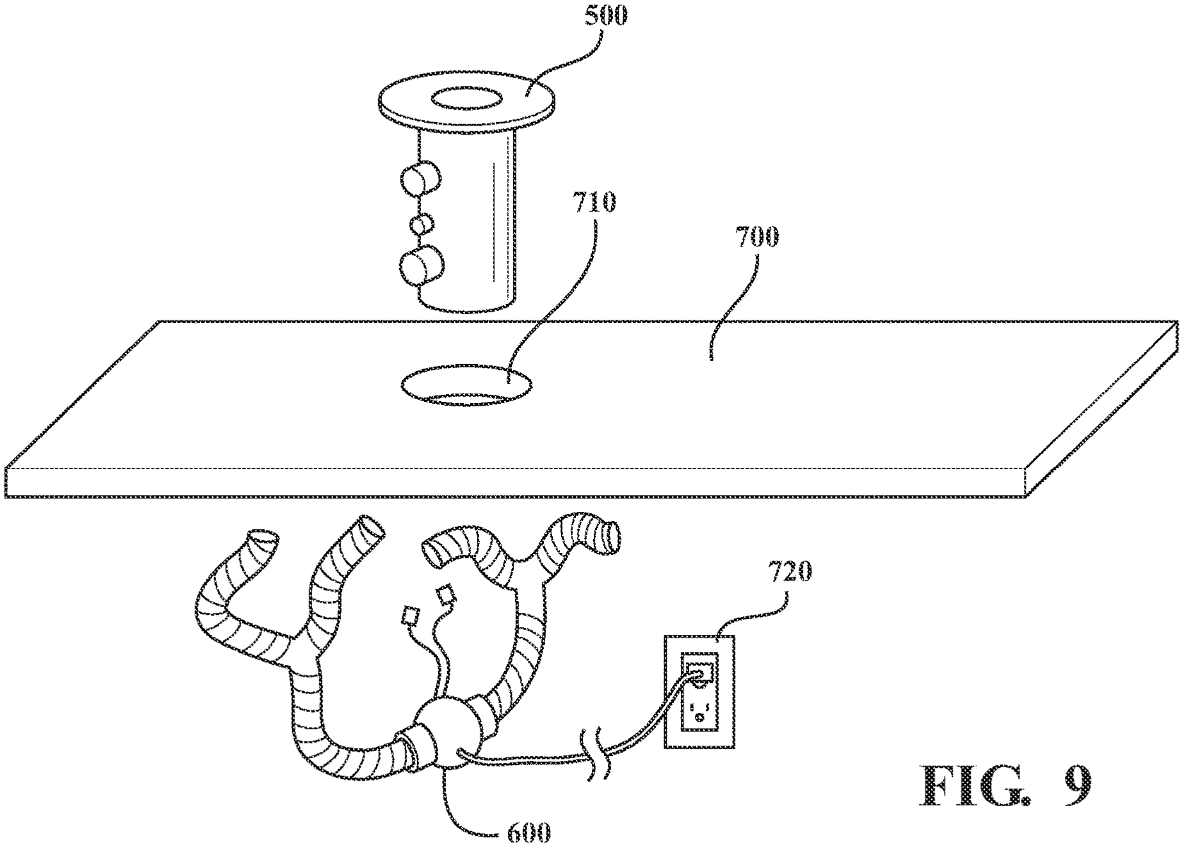
FIG. 9 illustrates in perspective view the hairbrush cavity of FIG. 7 being installed to a countertop, with the air heating circuit of FIG. 8 being plugged in under the countertop in preparation for being assembled to the hairbrush cavity, in accordance with the present disclosure.

FIG. 9 illustrates in perspective view the hairbrush cavity 500 of FIG. 7 being installed to a countertop, with the air heating circuit 600 of FIG. 8 being plugged in under the countertop in preparation for being assembled to the hairbrush cavity. Countertop 700 is illustrated including aperture 710. Hairbrush cavity 500 is illustrated prepared for insertion/installation into aperture 710. Aperture 710 is large enough to receive a majority of hairbrush cavity 500 while being small enough to permit an annular lip of hairbrush cavity 500 to rest upon a top surface of countertop 700. Air heating circuit 600 is illustrated below countertop 700 and plugged into electrical outlet 720. Air heating circuit 600 includes air supply hoses, air return hoses, ducts, channels, etc., and electrical leads operable to be attached to hairbrush cavity 500, such that hairbrush cavity 500 and air heating circuit 600 collectively operate as a hairbrush heating device in accordance with the disclosure.

Figure 10:
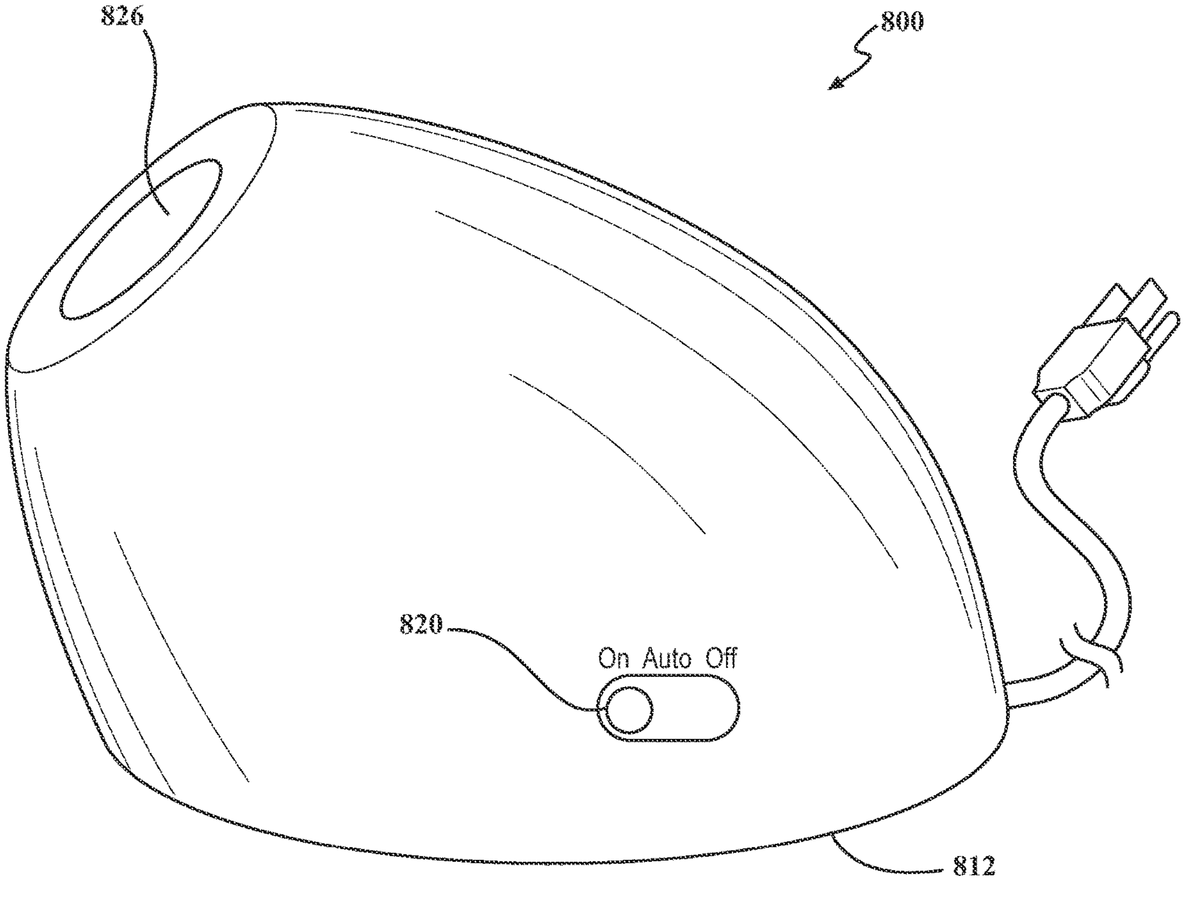
FIG. 10 illustrates in perspective view an alternative hairbrush heating device including an ergonomic angled orientation, in accordance with the present disclosure.

FIG. 10 illustrates in perspective view an alternative hairbrush heating device 800 including an ergonomic angled orientation. Hairbrush heating device 800 includes flat base 812, control hardware 820, and hairbrush cavity opening 826. Hairbrush heating device 800 is similar to the hairbrush heating device 100 of FIG. 2, with similar internal structures. However, hairbrush heating device 800 is oriented at an acute angle with respect to flat base 812, such that hairbrush cavity opening 826 is presented to one of the side surfaces of hairbrush heating device 800. According to one embodiment, various configurations with various degrees of angle with respect to flat base 812 enable different ergonomic conditions for placing and removing brushes from hairbrush cavity opening 826 and can be provided to meet the needs, preferences, height, etc., of particular users of the devices.

Figure 11:
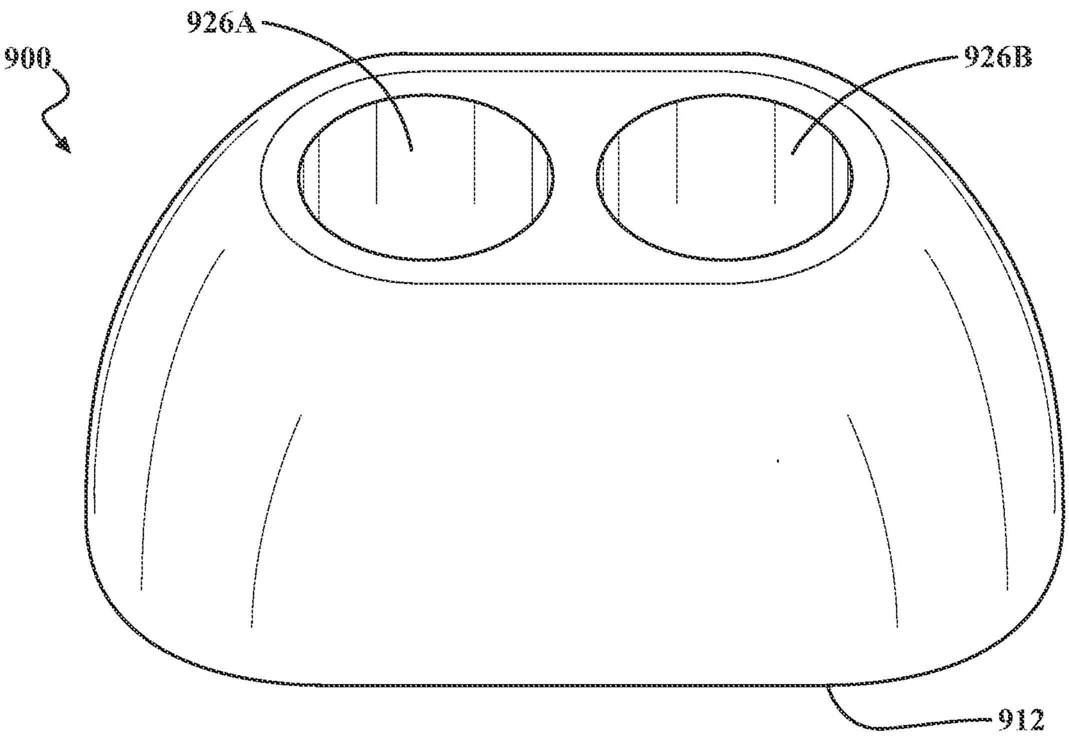
FIG. 11 illustrates in front view an alternative hairbrush heating device including an ergonomic angled orientation and two hairbrush cavity openings, in accordance with the present disclosure.

FIG. 11 illustrates in front view an alternative hairbrush heating device 900 including an ergonomic angled orientation and two hairbrush cavity openings. Hairbrush heating device 900 is angled with respect to flat base 912 similarly to hairbrush heating device 800 of FIG. 10. Hairbrush heating device 900 includes hairbrush cavity openings 926A and 926B, with each of the openings corresponding with a separate internal hairbrush cavity. Each of the hairbrush cavities can include its own dedicated heating element such as an infrared heating element or an air heating circuit. With dedicated heating elements, hairbrush heating device 900 can be more energy efficient than a device that always heats each of a plurality of hairbrush cavities, for example, only heating one of two brushes in the hairbrush cavities due to the second of the hairbrushes already being heated. In other embodiments, the hairbrush cavities can share a heating element such as a single air heating circuit. In such a sharing configuration, if either of the hairbrush cavities generates a sensor signal indicating that heating is needed, the air heating circuit is activated to both hairbrush cavities. Such a configuration including a shared heating element can be less expensive to manufacture than a configuration with dedicated heating elements in each hairbrush cavity. Heated air can be supplied in a parallel flow to the two heating cavities from the shared heating element, for example, with heated air being channeled equally to each of the two hair brush cavities to avoid one of the hairbrush cavities receiving warmer air than the second of the hairbrush cavities. Hairbrush heating device 900 is illustrated without any control hardware, with the device including a perpetually in automatic mode configuration. If hairbrush heating device 900 is plugged in and powered, the device will supply activate a heating element if a brush is placed within one of the hairbrush cavities and activates a sensor within the hairbrush cavity.

Figure 12:
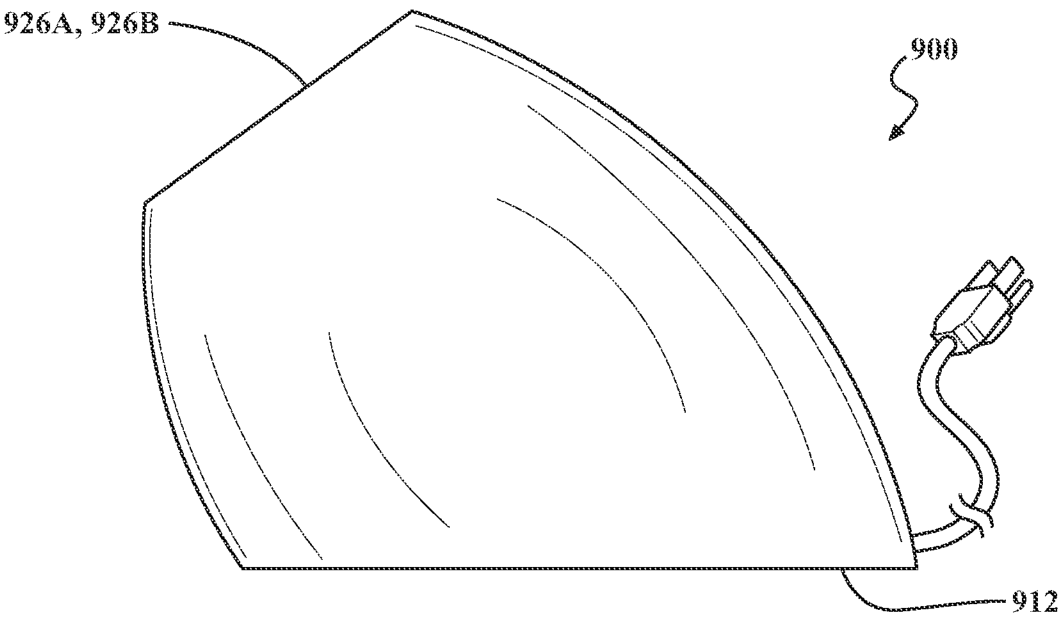
FIG. 12 illustrates a side view the hairbrush heating device of FIG. 11, in accordance with the present disclosure.

FIG. 12 illustrates a side view the hairbrush heating device 900 of FIG. 11. Hairbrush heating device 900 includes hairbrush cavity openings 926A and 926B. Hairbrush heating device 900 further includes flat base 912.

Figure 13:
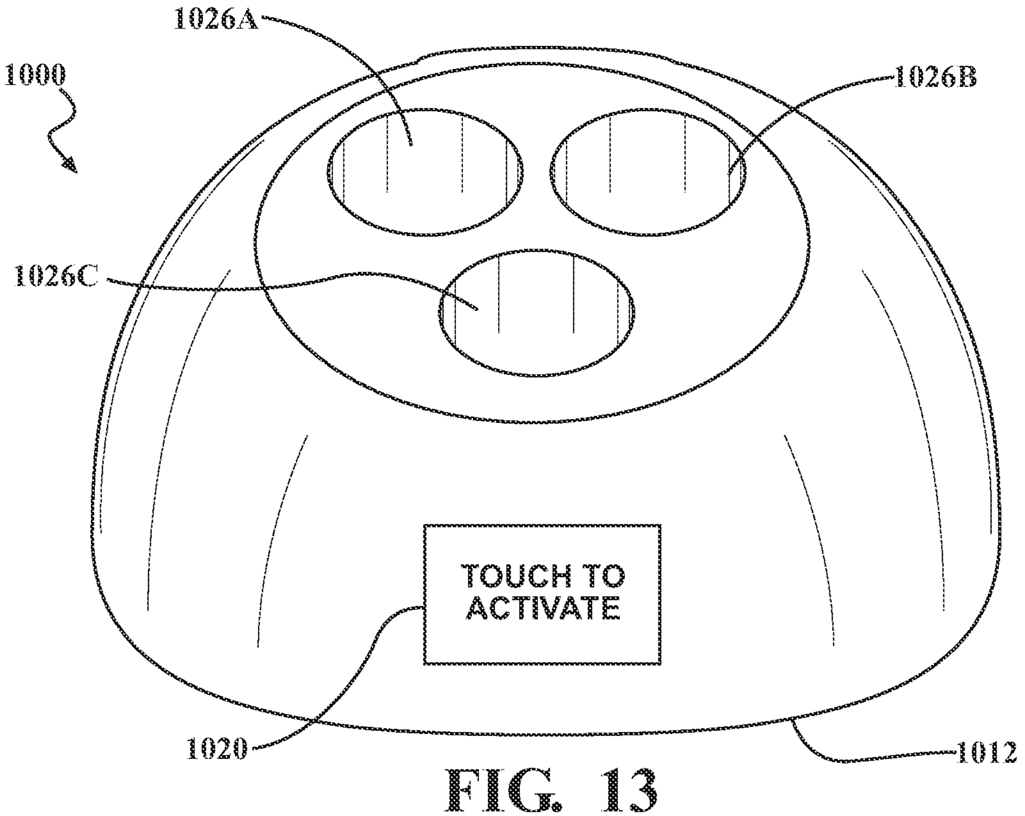
FIG. 13 illustrates in front view an alternative hairbrush heating device including an ergonomic angled orientation and three hairbrush cavity openings, in accordance with the present disclosure.

FIG. 13 illustrates in front view an alternative hairbrush heating device 1000 including an ergonomic angled orientation and three hairbrush cavity openings. Hairbrush heating device 1000 is angled with respect to flat base 1012 similarly to hairbrush heating device 900 of FIG. 11. Hairbrush heating device 1000 includes hairbrush cavity openings 1026A, 1026B, and 1026C, with each of the openings corresponding with a separate internal hairbrush cavity. Each of the hairbrush cavities can include its own dedicated heating element such as an infrared heating element or an air heating circuit. In other embodiments, the hairbrush cavities can share a heating element such as a single air heating circuit. Hairbrush heating device 1000 is illustrated including touchscreen control hardware 1020. Touchscreen control hardware 1020 may include or may be in electronic communication with a computerized controller, for example, including programming operable to control various aspects of hairbrush heating device 1000. This includes changing time and power output of heating elements in response to a brush being placed in one of hairbrush cavity openings 1026A, 1026B, and 1026C, processes to maintain heat in the hairbrush cavities, for example, including a timeout period if no user interacts with any of the brushes for a threshold time, and air blower speed controls. Touchscreen control hardware 1020 can provide graphical displays of various options available to a user and may receive user inputs to a touchscreen display of touchscreen control hardware 1020. According to one embodiment, each hairbrush cavity associated with each of hairbrush cavity openings 1026A, 1026B, and 1026C can each include a separately controllable infrared heating element, and electrical power can be modulated separately to each of the controllable infrared heating elements to achieve individual control over temperature and heating cycles of each of the hairbrush cavities.

Figure 14:
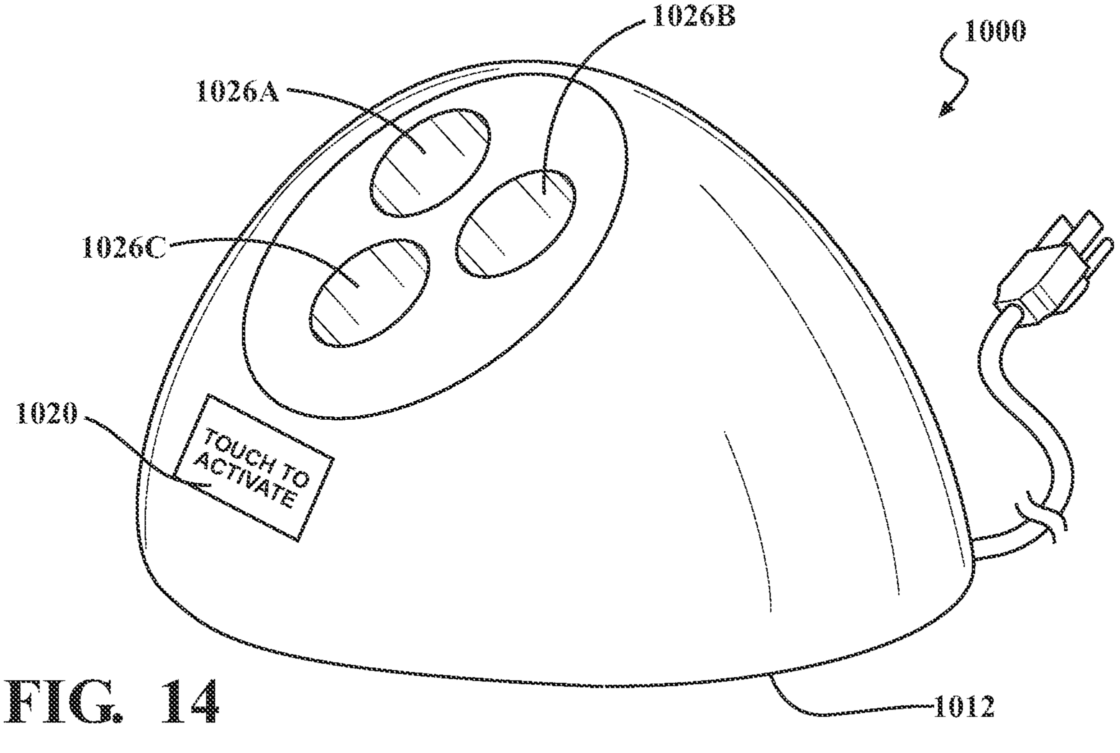
FIG. 14 illustrates in perspective view the hairbrush heating device of FIG. 13, in accordance with the present disclosure.

FIG. 14 illustrates in perspective view the hairbrush heating device 1000 of FIG. 13. Hairbrush heating device 1000 is illustrated including hairbrush cavity openings 1026A, 1026B, and 1026C. Hairbrush heating device 1000 is further illustrated including flat base 1012 and touchscreen control hardware 1020. FIGS. 11 and 12 and FIGS. 13 and 14 illustrate hairbrush heating devices with two and three hairbrush heating cavities, respectively. Similar hairbrush heating devices can be produced with three, four, five or any other number of hairbrush cavities in accordance with the present disclosure.

Control methods and processes described herein may be achieved through use of a controller including a computerized processor, random access memory (RAM), durable memory operable to store data, an analog-digital converter, and programming operable to receive inputs and carry out determinations necessary to achieve functionality described herein. In simpler embodiments of the disclosure, a circuit board can be used to achieve simple tasks such as conditional operation of the heating element based upon activation of a sensor detecting presence of a hairbrush within a hairbrush cavity.

While the best modes for carrying out the disclosure have been described in detail, those familiar with the art to which this disclosure relates will recognize various alternative designs and embodiments for practicing the disclosure within the scope of the appended claims.

What is claimed is:

1. A hairbrush heating device operable to selectively heat a hairbrush placed there within, comprising:

a hairbrush cavity including an opening configured to receive a portion of the hairbrush including bristles into the hairbrush heating device, wherein the hairbrush cavity is cylindrical with a round cross section;

a sensor operable to output a signal indicating presence of the hairbrush within the hairbrush cavity; and an infrared heating element separate from the hairbrush and disposed within the hairbrush cavity and operable to selectively provide heat directly through radiative heat to the bristles of the hairbrush within the hairbrush cavity only when the hairbrush is present within the cavity based upon the signal from the sensor; and wherein the hairbrush cavity includes at least one closing elastic flap operable to contact a handle portion of the hairbrush once the hairbrush is placed within the device and interrupt air flow through the opening of the hairbrush cavity and wherein the elastic flap is configured to prevent the infrared heating element from heating the handle portion of the hairbrush.

2. The hairbrush heating device of claim 1, wherein the hairbrush cavity includes a temperature sensor; and wherein the heating element is controlled based upon utilizing data from the temperature sensor to maintain a temperature within the hairbrush cavity within a desired temperature range.

3. The hairbrush heating device of claim 2, further comprising control hardware operable to receive inputs from a user setting values for the desired temperature range.

4. The hairbrush heating device of claim 1, further comprising control hardware operable to enable a user to select between an off state, an on state, and an automatic state.

5. The hairbrush heating device of claim 1, further comprising touchscreen control hardware operable to display options to a user and receive a user input.

6. The hairbrush heating device of claim 1, further comprising a plurality of hairbrush cavities.

7. The hairbrush heating device of claim 1, further comprising a plurality of hairbrush cavities;

further comprising a plurality of infrared heating elements; and wherein each of the hairbrush cavities includes one of the infrared heating elements.

8. The hairbrush heating device of claim 7, wherein each of the infrared heating elements is individually controllable.

9. The hairbrush heating device of claim 1, wherein the hairbrush cavity is configured to be installed to an aperture in a countertop.

10. The hairbrush heating device of claim 1, further comprising a flat base; and wherein the hairbrush cavity is oriented at an acute angle with respect to the flat base.

11. The hairbrush heating device of claim 10, further comprising a plurality of hairbrush cavity openings.

12. A system operable to selectively heat a hairbrush placed there within, comprising:

the hairbrush including a portion including a plurality of bristles and a handle portion, wherein the plurality of bristles is black such that radiative heat may be readily absorbed by the plurality of bristles and wherein the handle portion is a non-black color;

a hairbrush heating device including:

a hairbrush cavity including an opening configured to receive the portion of the hairbrush into the hairbrush heating device, wherein the hairbrush cavity is cylindrical with a round cross section;

a sensor operable to output a signal indicating presence of the hairbrush within the hairbrush cavity; and an infrared heating element separate from the hairbrush and disposed within the hairbrush cavity and operable to selectively provide heat directly through radiative heat to the bristles of the hairbrush within the hairbrush cavity only when the hairbrush is present within the cavity based upon the signal from the sensor; and wherein the hairbrush cavity includes at least one closing elastic flap operable to contact the handle portion of the hairbrush once the hairbrush is placed within the device and interrupt air flow through the opening of the hairbrush cavity and wherein the elastic flap is configured to prevent the infrared heating element from heating the handle portion of the hairbrush.

13. The system of claim 12, wherein the hairbrush cavity includes a plurality of closing elastic flaps operable to contact around a perimeter of the handle portion of the hairbrush once the hairbrush is placed within the device.

14. The hairbrush heating device of claim 12, wherein the handle portion of the hairbrush is white to minimize absorption of radiative heat.

15. A hairbrush heating device operable to selectively heat a hairbrush placed there within, comprising:

a hairbrush cavity including an opening configured to receive a portion of the hairbrush including bristles into the hairbrush heating device and a plurality of elastic flaps operable to contact around a perimeter of a handle portion of the hairbrush once the hairbrush is placed within the device and interrupt air flow through the opening of the hairbrush cavity, wherein the hairbrush cavity is cylindrical with a round cross section;

a sensor operable to output a signal indicating presence of the hairbrush within the hairbrush cavity;

an infrared heating element separate from the hairbrush and disposed within the hairbrush cavity and operable to selectively provide heat directly through radiative heat to the bristles of the hairbrush within the hairbrush cavity only when the hairbrush is present within the cavity based upon the signal from the sensor; and a temperature sensor; and wherein the elastic flaps are configured to prevent the infrared heating element from heating a handle portion of the hairbrush; and wherein the heating element is controlled based upon utilizing data from the temperature sensor to maintain a temperature within the hairbrush cavity within a desired temperature range.

16. The hairbrush heating device of claim 15, further comprising control hardware operable to receive inputs from a user setting values for the desired temperature range.

* * * * *